(12) United States Patent
Schoener (10) Patent No.: US 11,162,398 B2
(45) Date of Patent: Nov. 2, 2021

(54) CAM FOR A CAMSHAFT

(71) Applicant: Neumayer Tekfor Engineering GmbH, Hausach (DE)

(72) Inventor: Daniel Schoener, Oberharmersbach (DE)

(73) Assignee: Neumayer Tekfor Engineering GmbH, Hausach (DE)

( * ) Notice: Subject to any disclaimer, the term of this patent is extended or adjusted under 35 U.S.C. 154(b) by 0 days.

(21) Appl. No.: 16/898,699

(22) Filed: Jun. 11, 2020

(65) Prior Publication Data

US 2021/0018082 A1 Jan. 21, 2021

(30) Foreign Application Priority Data

Jul. 18, 2019 (DE) ...................... 10 2019 005 036.3

(51) Int. Cl.
| | |
|---|---|
| *F01L 13/00* | (2006.01) |
| *F16H 53/02* | (2006.01) |
| *F01L 1/08* | (2006.01) |
| *F01L 1/047* | (2006.01) |

(52) U.S. Cl.
CPC ............. *F01L 13/0036* (2013.01); *F01L 1/08* (2013.01); *F16H 53/025* (2013.01); *F01L 1/047* (2013.01)

(58) Field of Classification Search
CPC . F01L 1/08; F01L 13/0036; F01L 2013/0052; F16H 53/025
See application file for complete search history.

(56) References Cited

U.S. PATENT DOCUMENTS

| | | | | |
|---|---|---|---|---|
| 4,768,475 A | * | 9/1988 | Ikemura ................... | F01L 1/181 123/90.16 |
| 6,923,151 B2 | * | 8/2005 | Kreuter ............... | F01L 13/0036 123/90.16 |
| 7,305,953 B2 | * | 12/2007 | Walz ....................... | B23P 11/00 123/90.27 |
| 7,966,983 B2 | * | 6/2011 | Clever ................. | B21D 53/845 123/90.6 |
| 8,312,849 B2 | * | 11/2012 | Roe ..................... | F01L 13/0005 123/90.16 |

(Continued)

FOREIGN PATENT DOCUMENTS

| | | |
|---|---|---|
| DE | 40 17 239 C2 | 9/1999 |
| DE | 10 2009 022 086 A1 | 11/2010 |

(Continued)

OTHER PUBLICATIONS

German-language Search Report issued in German Application No. 10 2019 005 036.3 dated Mar. 10, 2020 with partial English translation (13 pages).

*Primary Examiner* — Jeremy R Severson
(74) *Attorney, Agent, or Firm* — Crowell & Moring LLP (57) ABSTRACT

A cam having at least two part cams are arranged axially behind one another along a longitudinal axis includes an undercut between the cam parts. The part cams have running faces which lie radially on the outside of the part cams and have different variable running face contours. The undercut has a profile with a variable contour which is dependent in each case on that adjacent running face contour which is at a smaller radial spacing from the longitudinal axis than the other running face contour.

3 Claims, 6 Drawing Sheets

(56) References Cited

U.S. PATENT DOCUMENTS

| | | | |
|---|---|---|---|
| 8,807,106 B2* | 8/2014 | Johnson | F01L 1/047 |
| | | | 123/90.6 |
| 9,046,011 B2* | 6/2015 | Kujas | F01L 1/08 |
| 9,194,260 B2* | 11/2015 | Zurface | F01L 1/185 |
| 2007/0074685 A1 | 4/2007 | Walz | |
| 2014/0150743 A1 | 6/2014 | Kujas et al. | |

FOREIGN PATENT DOCUMENTS

| | | |
|---|---|---|
| DE | 10 2011 109 764 A1 | 2/2013 |
| DE | 10 2017 214 728 A1 | 2/2019 |
| WO | WO 2005/090756 A1 | 9/2005 |

* cited by examiner

CAM FOR A CAMSHAFT

CROSS REFERENCE TO RELATED APPLICATION

This application claims priority under 35 U.S.C. § 119 from German Patent Application No. 10 2019 005 036.3, filed Jul. 18, 2019, the entire disclosure of which is herein expressly incorporated by reference.

BACKGROUND AND SUMMARY OF THE INVENTION

The present invention relates to a cam for a camshaft, as is used, in particular, in an internal combustion engine.

Camshafts in internal combustion engines serve to open and close the individual valves and therefore to control the engine. For this purpose, the cams in each case have an outer contour as a running face which is brought into contact with what is known as a rocker arm. In order to make different variants of the control method possible, it is known in the prior art to use camshafts, on which cams with different running faces are assigned to the individual rocker arms. The adjustment takes place by way of the axial displacement of the camshafts, with the result that in each case different cams come into engagement with the rocker arms. The multiple cams which are provided for this purpose have at least two part cams. For the displacement, the part cams have a common base circle phase. A multiple cam of this type can be gathered, for example, from DE 10 2011 109 764 A1 or DE 10 2017 214 728 A1.

WO 2005/090756 A1 describes an assembled multiple cam which is composed of individual components. DE 40 17 239 C2 discloses a machining production of a single-piece multiple cam. DE 10 2009 022 086 A1 discloses a tool for producing a multiple cam.

For the production of a multiple cam, for example, it is known to produce a blank by way of hot pressing, and to obtain the part cams and an undercut between the part cams by way of machining. The undercut which is as a rule circular serves for subjecting the part cams to a grinding operation, the grinding disk running in the "open"; that is to say, said grinding disk is not to have any contact of its edge with the cam. Finally, the honed regions are usually deburred.

The object of the invention consists in proposing a cam which makes a more effective production possible and which is distinguished by improved properties in comparison with the cams in the prior art.

The invention achieves the object by way of a cam for a camshaft (preferably of an internal combustion engine), with at least two part cams which are arranged axially behind one another along a longitudinal axis, and with an undercut which is situated between the two part cams, the at least two part cams having running faces which lie in each case in a radial direction on the outside and have variable running face contours, the running face contours describing a respective course of the associated running face in the radial direction around the longitudinal axis, the undercut having a profile with a contour, the profile describing a course of the undercut along the longitudinal axis, the contour describing a course of the profile in the radial direction around the longitudinal axis, the contour being variable, the running face contours of the at least two part cams differing from one another, and the contour being dependent on the running face contours in such a way that the contour is in each case dependent on that running face contour which is at a smaller radial spacing from the longitudinal axis than the other running face contour.

In the case of the cam according to the invention, at least two part cams are provided which in each case have a running face contour and which are arranged behind one another along a longitudinal axis of the cam. Here, the running face contour is the radial course of the outer face of the part cams, the radial direction lying perpendicularly on the longitudinal axis. The running face contours therefore describe the radial course of the outer faces of the part cams around the longitudinal axis.

An undercut is situated between the two part cams. Here, the undercut is a depression in the direction of the longitudinal axis, in contrast to the part cams as a definition of elevations away from the longitudinal axis. In addition, the undercut is also an indentation relative to the adjacent sides of the part cams. The undercut firstly has a profile and secondly has a contour. The profile is the course along the longitudinal direction and is therefore the view of the undercut when the region of the cam around the undercut is viewed from the side and therefore perpendicularly with respect to the longitudinal axis. To this end, the profile of the undercut is identified by way of a depression and the course of the side flanks. The contour in turn describes the course of the undercut radially around the longitudinal axis. Here, "undercut" is to be understood in general to mean a recess in the cam, which recess can also be produced using forming technology and has the abovementioned shape in relation to contour and profile.

Therefore, above and below the longitudinal axis, a section along the longitudinal axis through the cam shows the respective (part cam) profiles of the part cams and, in between, the profile of the undercut. In one refinement, at least one profile of a part cam runs parallel to the longitudinal axis. The contour of the undercut and the part cam contours are shown in the case of sections along the associated heights of the longitudinal axis.

It is provided in the case of the cam according to the invention that the contour of the undercut is variable and, in particular, is not constant. The contour therefore, above all, does not describe a circular undercut.

It has been shown that the cam is distinguished by a higher stability than in the prior art. If the cam is produced using forming technology, contact or flexural stresses in the forming die are additionally reduced. This increases, for example, the service life of the die. A further advantage in the case of said type of production and in the case of the particular embodiment of the cam is that a higher filling ratio with a lower pressing force is set in comparison with the prior art.

The running face contours of the at least two part cams differ from one another. The part cams produce different closing behaviors of the associated cylinders due to their running face contours, and therefore ensure a respective dedicated operation of the associated cylinder.

In one refinement, the cam has three part cams, between which two undercuts are situated. Therefore, the discussed refinements also apply in each case to a combination of two adjoining part cams and the undercut which is arranged in between.

According to the invention, the contour of the undercut is dependent on the running face contours. The radial course of the profile of the undercut is dependent on the radial course of the part cams. The part cams are, in particular, the part cams which are directly adjacent with respect to the undercut, that is to say flank the latter laterally.

The dependence of the contour of the undercut on the running face contours is brought about in one refinement by way of a projection of the part cams, the contour in each case following that part cam which is at the smallest spacing from the longitudinal axis, that is to say which extends to the smallest extent radially to the outside.

According to the invention, the contour is dependent in each case on that running face contour which is at a smaller radial spacing from the longitudinal axis than the other running face contour. The contour of the undercut follows in each case that running face contour of the two running face contours which is distinguished by their respective smallest spacing from the longitudinal axis. If the two running face contours are at the same spacing from the longitudinal axis in one region, for example in a base circle, the contour of the undercut follows the two running face contours.

One refinement provides that there is a tangential transition on regions of the contour, on which regions a change of the dependence takes place from one to another running face contour. As an alternative, a change might take place between the regions by way of a straight section with rounded corners.

One refinement consists in that the profile is constant along the contour. In said refinement, the profile is in each case the same in a radially circumferential manner, and the same profile of the undercut is shown in the case of every section through the cam. Since the contour changes, however, the same profile is at a different spacing from the longitudinal axis, for example.

An alternative refinement consists in that the profile is variable along the contour. Therefore, in said refinement, the undercut has a variable profile and a variable contour. This means that the shape of the undercut changes along the longitudinal axis and also in a radially circumferential manner about the longitudinal axis.

One refinement provides that the profile has an axis of symmetry which lies perpendicularly on the contour.

One refinement provides that a depth as the respective smallest spacing from the longitudinal axis of the profile is constant along the contour. In said refinement, that region of the profile which is at the smallest spacing from the longitudinal axis is in each case at the same spacing from the longitudinal axis. Here, this is independent of whether the shape of the profile changes or stays the same.

One refinement provides that a depth as the respective smallest spacing from the longitudinal axis of the profile is variable along the contour. In said refinement, the respective deepest region of the profile is in each case at a different spacing from the longitudinal axis. Therefore, said deepest region is arranged in part in a more closely adjacent manner with respect to or further away from the longitudinal axis. In one refinement, the magnitude of the spacing is determined by way of the contour.

In one refinement, the undercut results by virtue of the fact that, in the case of the production of the cam, in each case substantially the same material quantity is removed or displaced using forming technology in a radially circumferential manner.

One refinement consists in that the part cams and the undercut are produced with the use of a forming technique. The forming technology is preferably a form of forging, for example hot pressing.

One refinement provides that the part cams have rounded portions toward their respective side faces, which rounded portions are produced using forming technology. As a result of the production using forming technology, no deburring is required, in particular, and rounded portions (or rounded sections) can also be produced directly here at the transitions of the running faces of the part cams to the side faces.

The invention relates to a method for producing a cam, at least two part cams and an undercut which is situated in between being produced using forming technology. Here, the refinements of the cam which are discussed above and in the following text correspondingly also relate to the matching production method. Repetition is therefore dispensed with.

In one refinement, a closing tool is used for the production, as described, for example, in DE 10 2009 022 086 A1 which has already been mentioned above.

In one refinement, the running faces of the cam are honed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
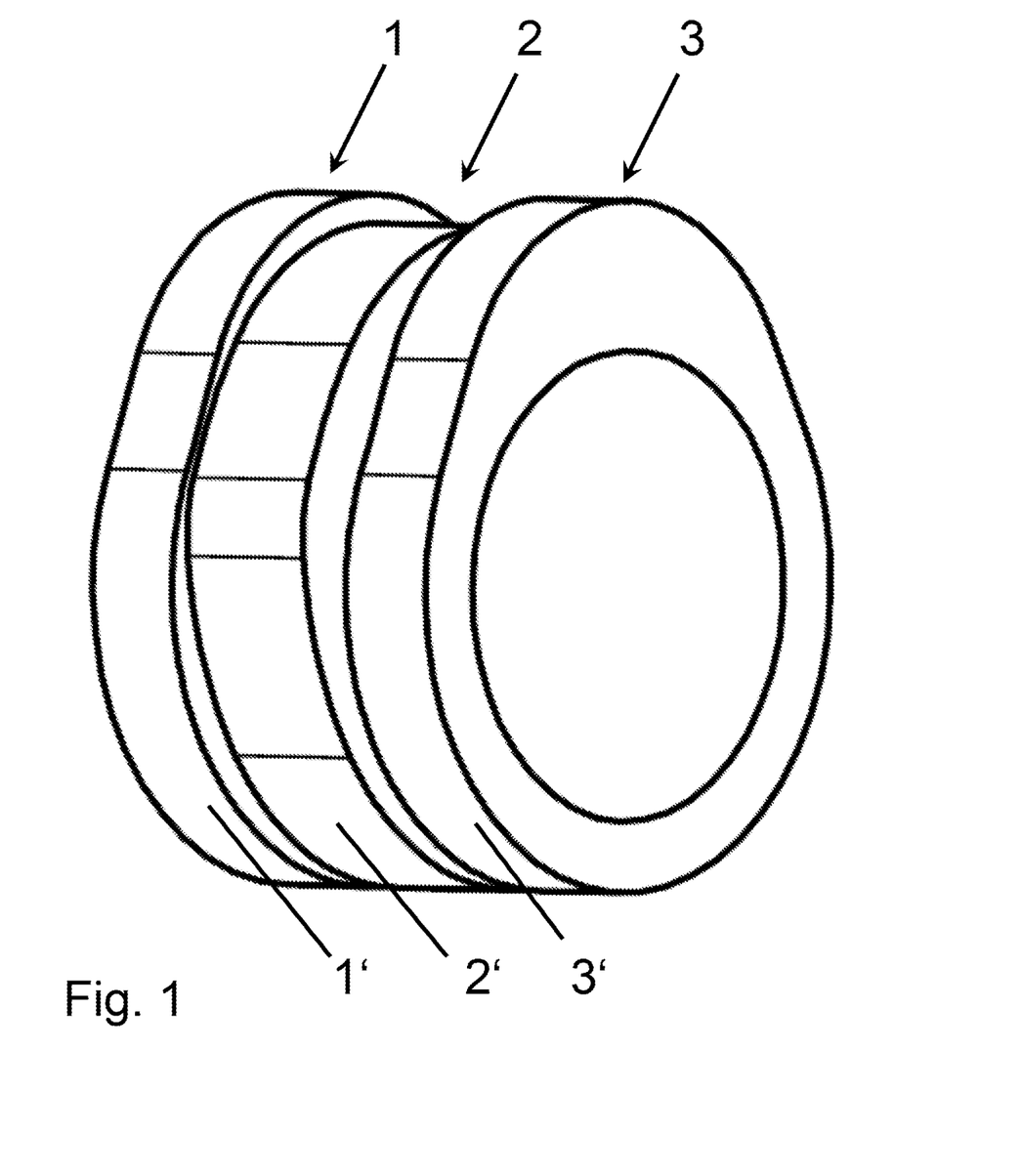
FIG. 1 shows a three-dimensional illustration of a multiple cam in accordance with an embodiment of the present invention.

FIG. 1 shows a multiple cam which has three part cams 1, 2, 3. The part cams 1, 2, 3 in each case have a running face 1', 2', 3', by way of which they come into contact with a rocker arm in the installed state. As a result, the different radial courses of the running faces 1', 2', 3' (that is to say, the variable running face contours) permit different switching behaviors of the associated cylinder of the internal combustion engine.

Figure 2:
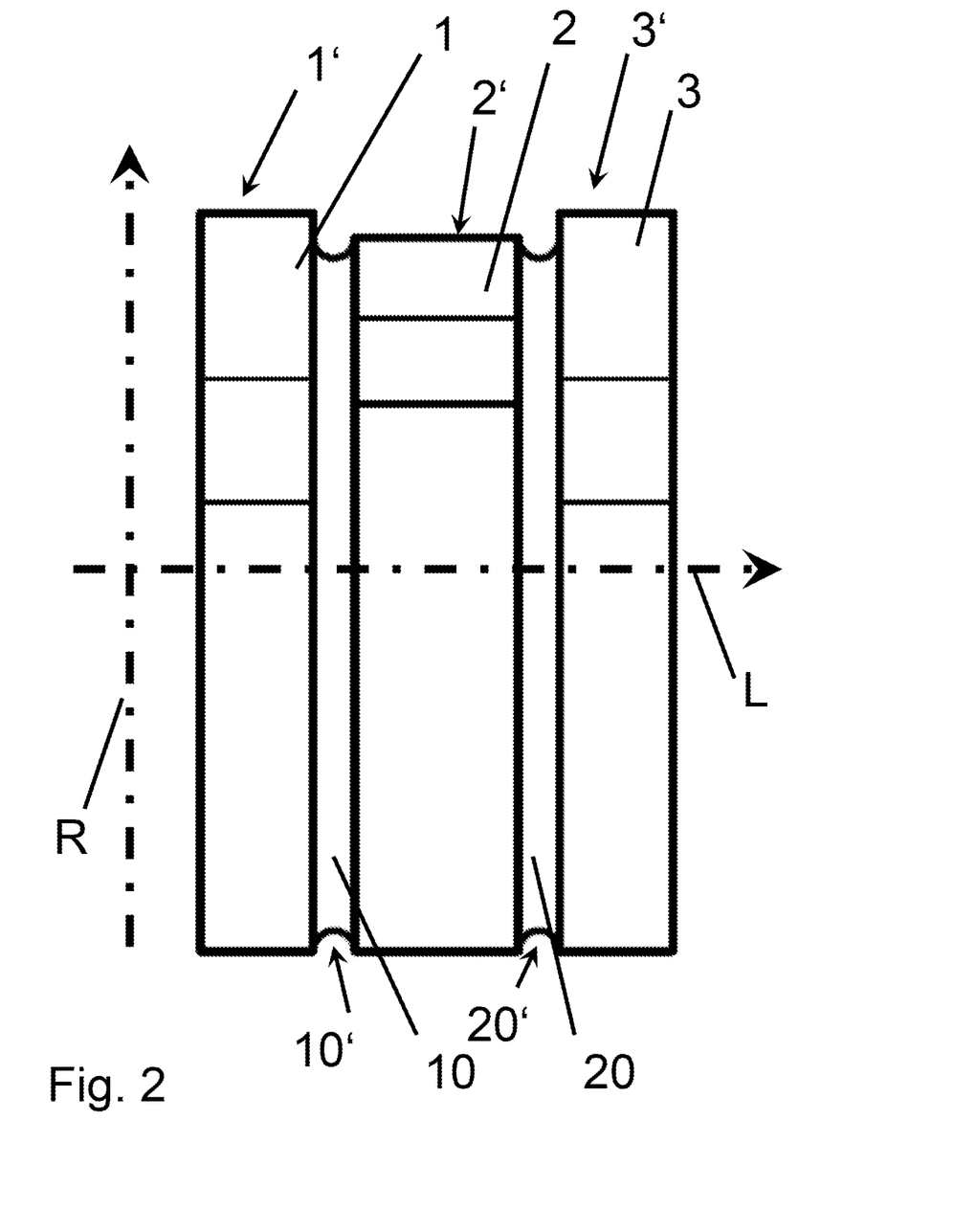
FIG. 2 shows an illustration from the side of the cam from FIG. 1.
Figure 3:
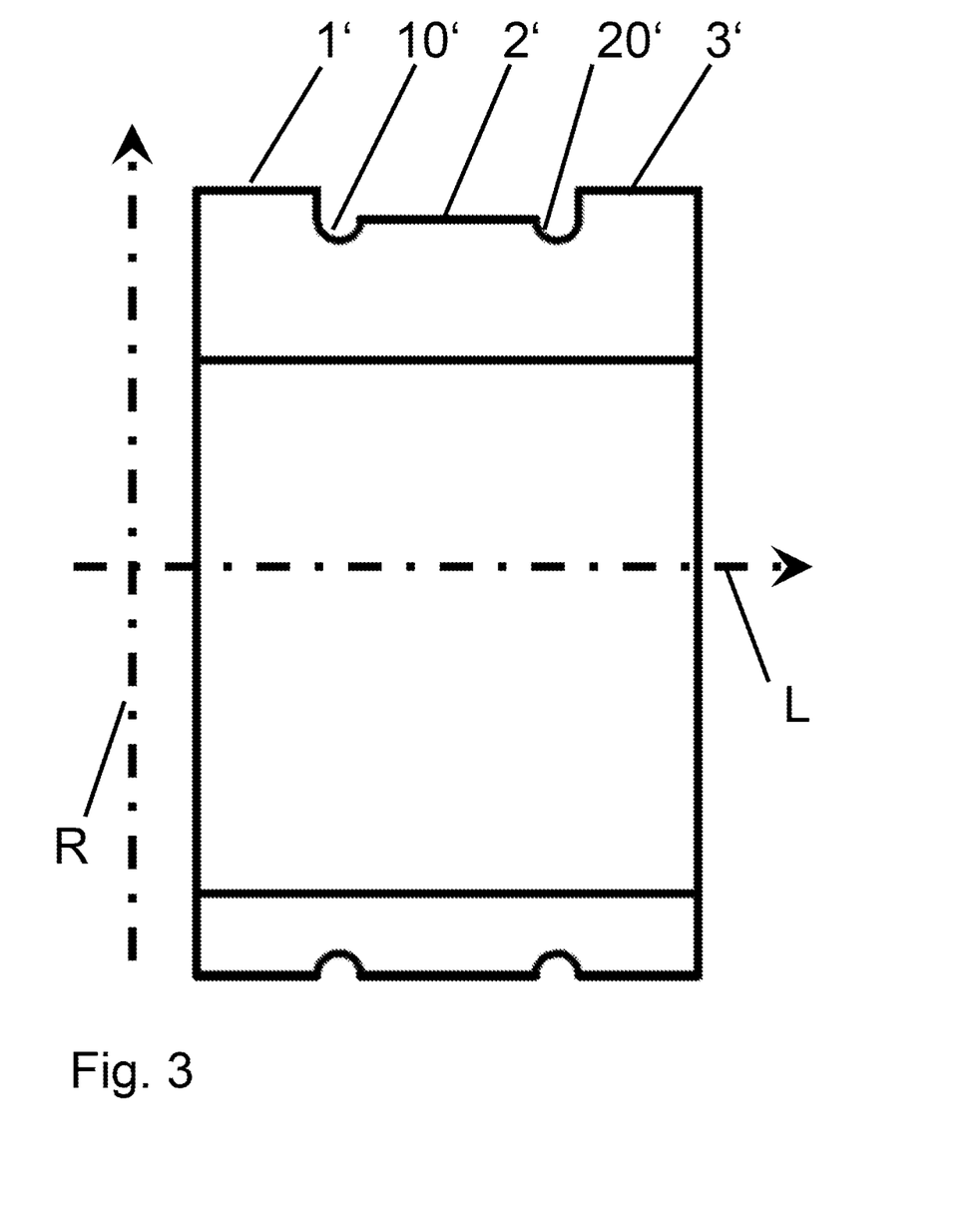
FIG. 3 shows a section through the cam from FIG. 1 along the longitudinal axis.
Figure 4:
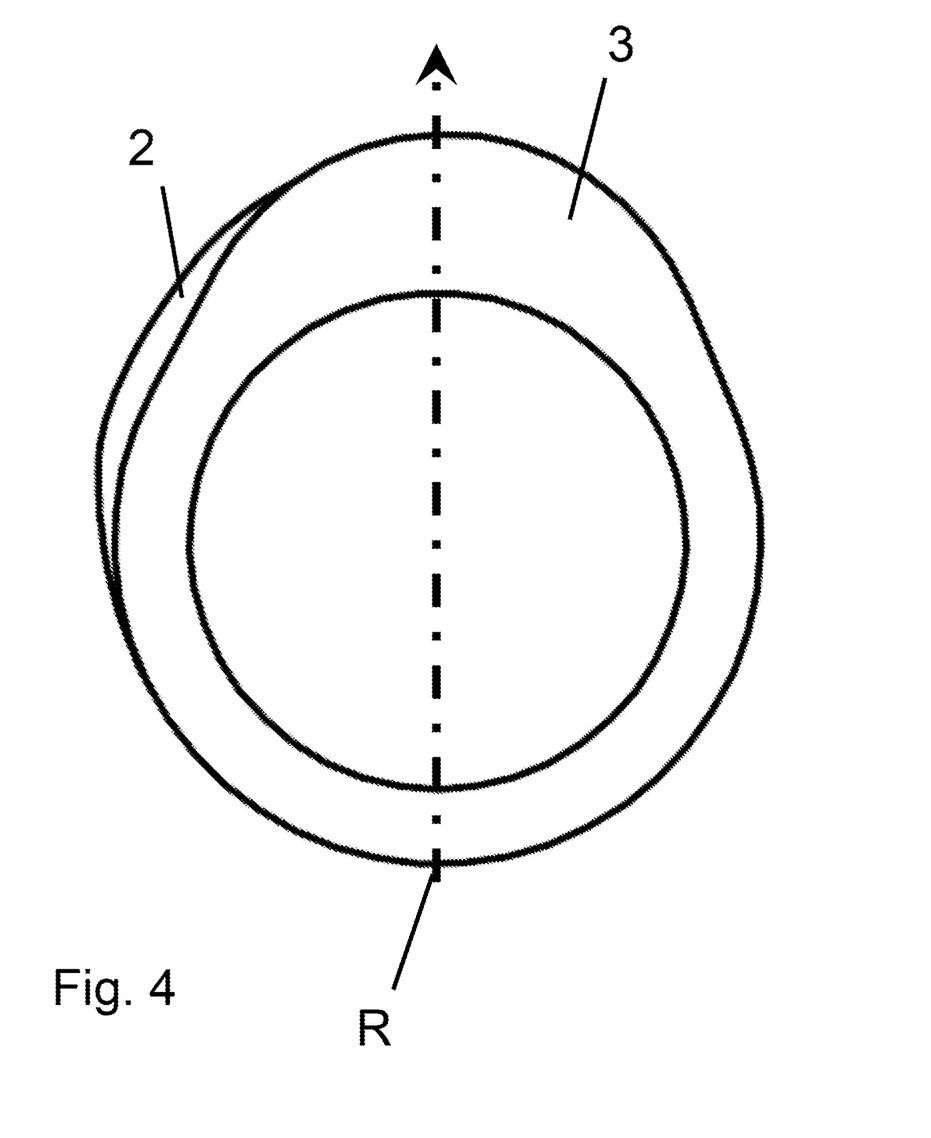
FIG. 4 shows a view of an end side of the cam from FIG. 1.

FIG. 2 shows the cam from FIG. 1 in a side view, and FIG. 3 shows a section along the longitudinal axis L. FIG. 4 illustrates a view of an end side of the cam. FIGS. 2, 3 and 4 will be discussed together in the following text.

It can be seen (see FIG. 2) how the three part cams 1, 2, 3 are situated behind one another along the longitudinal axis L. An undercut 10, 20 is situated between in each case two part cams 1, 2 and 2, 3.

The illustration from the side (see FIG. 2) and the section (see FIG. 3) allow a view of the profiles of the part cams 1, 2, 3 and the profiles 10', 20' of the undercuts 10, 20. The profiles describe the course along the longitudinal axis L.

Here, the profiles of the part cams 1, 2, 3 are in each case a constant course parallel to the longitudinal axis L. The profiles 10', 20' of the undercuts 10, 20 are distinguished in each case by a substantially symmetrical shape. There is a lowest point which is represented by the smallest spacing from the longitudinal axis L and, laterally with respect thereto, the flanks which run to the outside and are elevated as indentations with respect to the adjoining part cams 1, 2, 3.

The contours (see FIG. 4) in turn define the course in the radial direction R around the longitudinal axis L. It can be seen how the part cam 3 extends radially to the outside to a different extent with its outer running face, and how the middle part cam 2 protrudes radially beyond it in a region (as can be seen on the left here).

Figure 5:
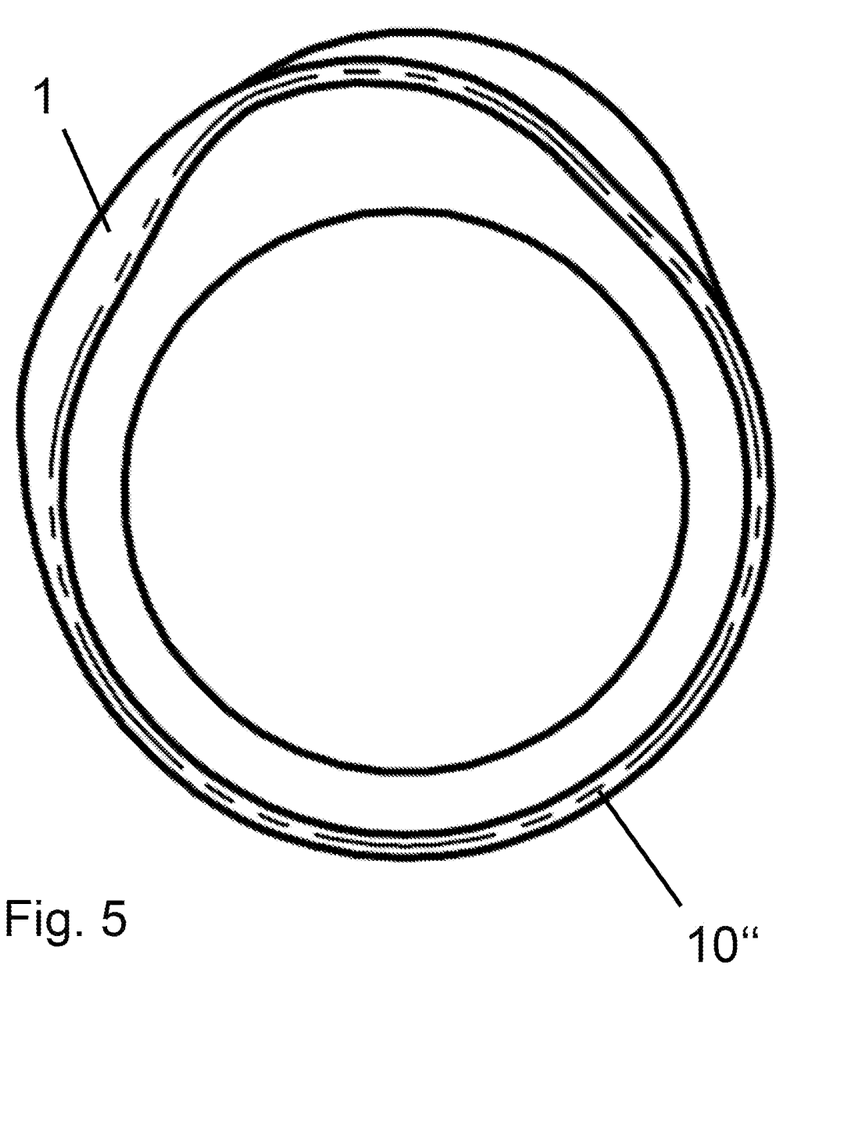
FIG. 5 shows a section through the cam from FIG. 1 perpendicularly with respect to the longitudinal axis.

FIG. 5 shows a section through the undercut 10 between the part cam 1 which is situated on the left hand side in FIG. 2 and the middle part cam 2. Here, the running face contour of the rear part cam 1 and, using dashed lines, the contour 10" of the undercut 10 can be seen.

Figure 6:
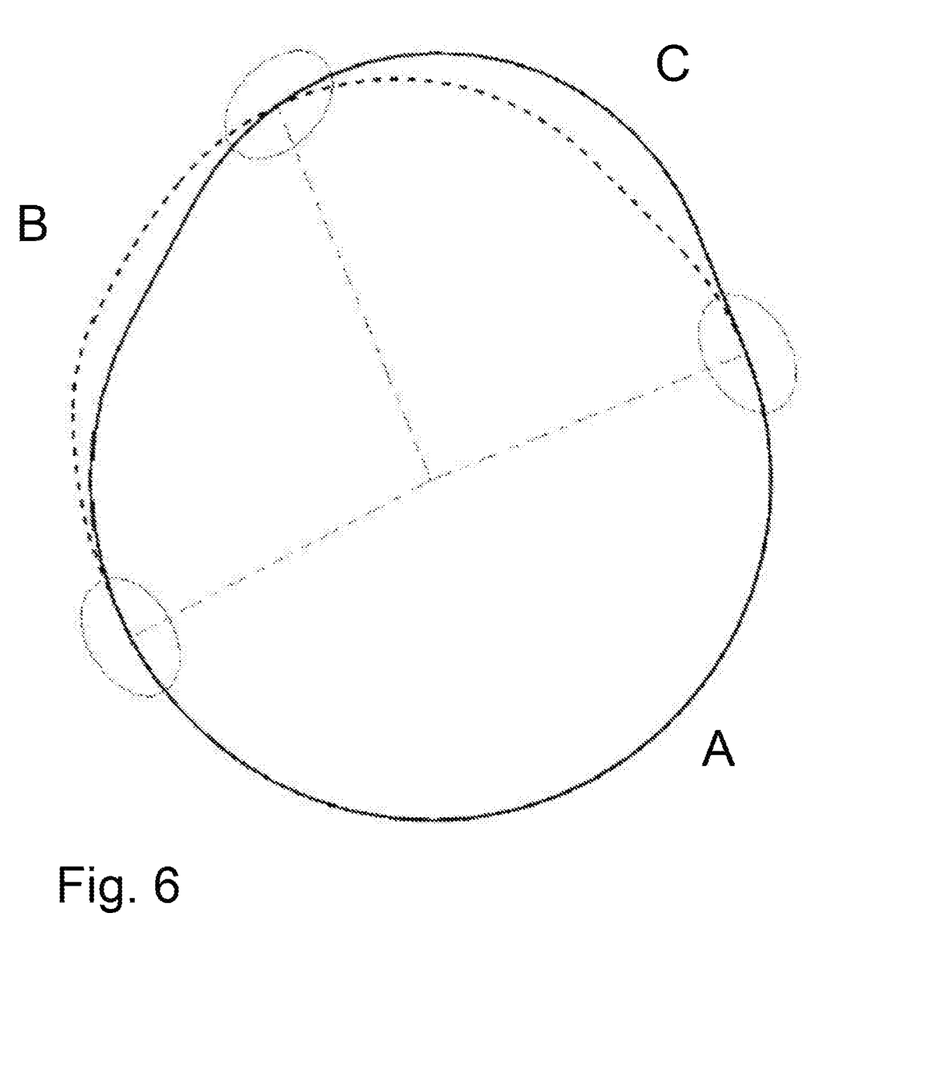
FIG. 6 shows a diagrammatic illustration of the dependence of the contour of the undercut in accordance with the present invention.

For improved clarification of the course of the contour of the undercut, FIG. 6 diagrammatically shows the dependence of the two adjoining part cams.

The running face contours of the two part cams are shown: one of them by way of a solid line and one of them by way of a dashed line. It can be seen that the two running face contours are identical in the region of what is known as the base circle (here, identified by A for sector A for clarification). This allows the axial displacement of the cam in the installed state. In said sector A, the contour of the undercut is therefore dependent on the two running face contours, since both are at the respectively smallest spacing from the longitudinal axis.

In addition, there is a first region (shown on the left here and denoted by B) and a second region (shown on the right here and denoted by C), in which regions in each case one of the two running face contours is arranged closer than the other to the longitudinal axis or has a smaller radial extent. In sector B, the running face contour which is shown by way of the solid line is at the smallest spacing from the longitudinal axis, with the result that the contour of the undercut follows said running face contour. In sector C, conversely, the other running face contour (shown by way of the dashed line) is at the smallest spacing from the longitudinal axis, and the contour of the running face follows said running face contour in said spatial angular region. Therefore, the contour of the undercut consists accordingly of three sectors, in which in each case the running face contour with the smallest radial extent is followed. This dependence is produced in one embodiment by virtue of the fact that the running face contours are projected onto the plane of the undercut, and the matching projection is used.

The regions of the change of the dependence of the contour of the undercut are identified by way of circles. In particular, a tangential transition takes place in said zones by way of example in the embodiment which is shown. Therefore, a radius which emanates from the longitudinal axis is also illustrated in each case for clarification, the transition being performed tangentially with respect to said radius.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cam for a camshaft, comprising:
   at least two part cams arranged axially next to one another along a longitudinal axis of the camshaft, and
   an undercut between adjacent ones of the at least two part cams,
   wherein
      the at least two part cams have radially outward-facing running faces with different variable running face contours in a circumferential direction around the camshaft longitudinal axis,
      the undercut has an undercut profile along the camshaft longitudinal axis and a variable undercut contour in a circumferential direction, and
      in the circumferential direction around the camshaft longitudinal axis, the undercut contour depends on the running face contours of the adjacent ones of the at least two cam parts, such that at any location around the camshaft in the circumferential direction a radial spacing of the undercut contour from the camshaft longitudinal axis is the same as a smallest radial spacing from the camshaft longitudinal axis of the adjacent ones of the at least two running face contours at a position along the longitudinal axis where the undercut profile meets the running face contour of the adjacent one of the at least two running face contours having the smallest radial spacing.

2. The cam according to claim 1,
   the undercut profile has an axis of symmetry perpendicular to the undercut contour.

3. The cam according to claim 1,
   the at least two part cams and the undercut are formed using a forming technique.

* * * * *